US006661462B2

(12) United States Patent
Ohnogi

(10) Patent No.: US 6,661,462 B2
(45) Date of Patent: Dec. 9, 2003

(54) DIGITAL CAMERA SELECTIVELY POWERED BY AN INTERNAL AND AN EXTERNAL POWER SUPPLY

(75) Inventor: Yasuharu Ohnogi, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/943,207

(22) Filed: Aug. 31, 2001

(65) Prior Publication Data

US 2002/0031350 A1 Mar. 14, 2002

(30) Foreign Application Priority Data

Sep. 14, 2000 (JP) ........................................ 2000-279702

(51) Int. Cl.[7] .............................................. H04N 5/225
(52) U.S. Cl. ..................... 348/372; 348/207.1; 348/552
(58) Field of Search ................................. 348/207, 372, 348/552, 232, 207.1, 207.11; 396/301, 303

(56) References Cited

U.S. PATENT DOCUMENTS

| 5,027,150 A | 6/1991 | Inoue et al. ................. 396/301 |
| 5,589,719 A | 12/1996 | Fiset ........................... 307/131 |
| 5,689,172 A | 11/1997 | Koyama et al. ............. 320/125 |
| 5,727,168 A | 3/1998 | Inoue et al. ................. 710/301 |
| 5,917,545 A | 6/1999 | Kowno et al. ............... 348/231 |
| 6,111,604 A | 8/2000 | Hashimoto et al. ....... 348/220.1 |
| 6,151,652 A | 11/2000 | Kondo et al. ............... 235/380 |
| 6,580,460 B1 | 6/2003 | Takahashi et al. .......... 348/372 |

FOREIGN PATENT DOCUMENTS

| JP | 121147 A7 | 5/1995 |
| JP | 163209 A9 | 6/1997 |

*Primary Examiner*—Andrew Christensen
*Assistant Examiner*—Eric Wisdahl
(74) *Attorney, Agent, or Firm*—Birch, Stewart, Kolasch & Birch, LLP

(57) ABSTRACT

A digital camera includes an interface via which the digital signals of a photographed image are transferred to an external data processing device, an internal power supply for the digital camera, and a power supply circuit that receives power from the data processing device. Connecting the data processing device to an interface of the camera via an interface in order to transfer image data from the camera to the device causes a control interface circuit to detect a connection detection signal which is turned on when the camera is connected to the device. Then, the power of an output of a DC/DC converter of the camera is switched from the internal battery to the power supply circuit of the device. The camera is started and put in a communication wait state. In response to a control signal from the device, the camera starts operation to transfer an image.

4 Claims, 1 Drawing Sheet

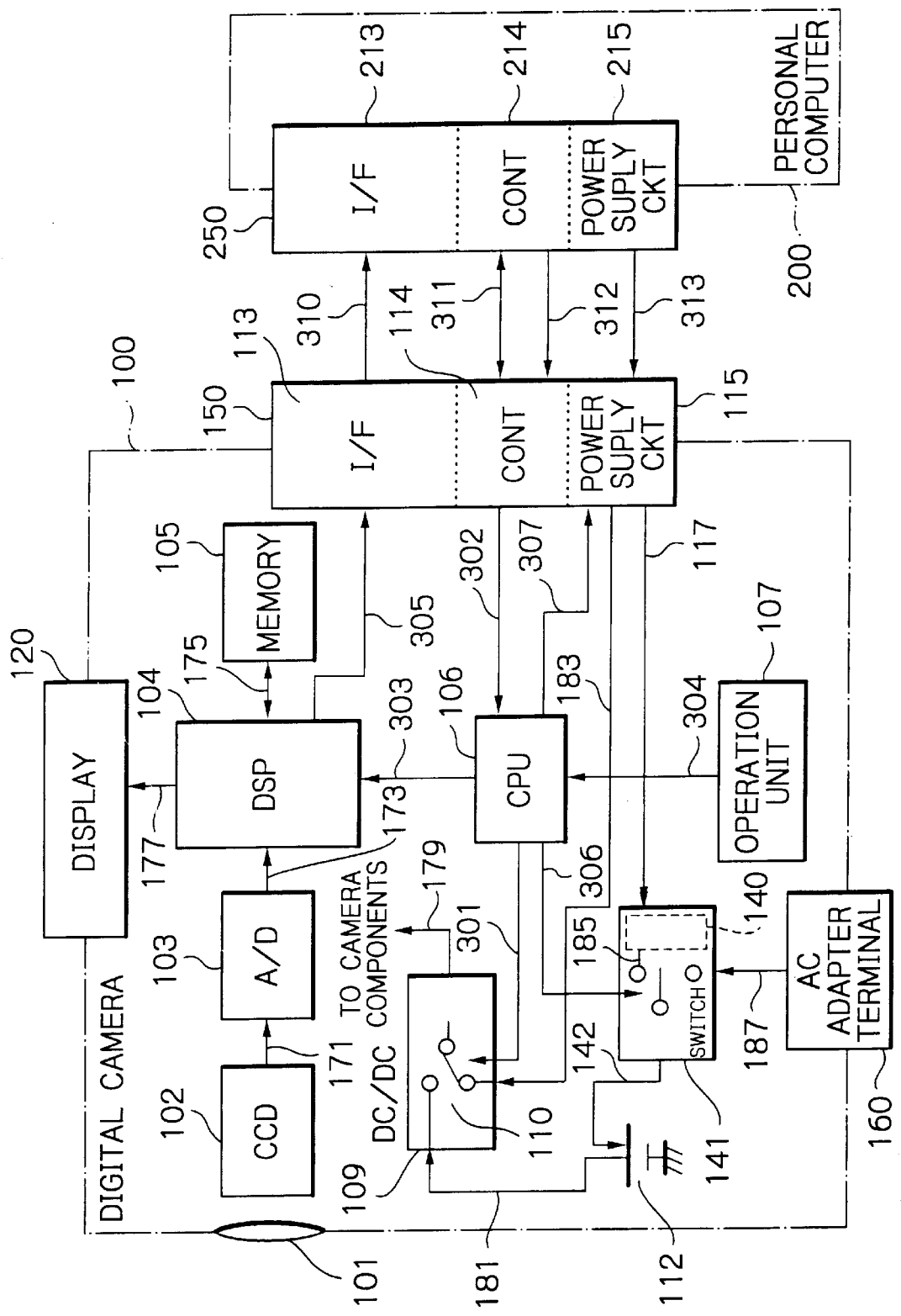

DIGITAL CAMERA SELECTIVELY POWERED BY AN INTERNAL AND AN EXTERNAL POWER SUPPLY

BACKGROUND OF THE INVENTION

1. Field of the Invention

The present invention relates to a digital camera and particularly to the control of power supply of a digital camera connected to a data processing device such as a personal computer.

2. Description of the Background Art

When displaying or browsing an image photographed by a digital camera, data representative of the photographed image is usually transferred for editing to a data processing device such as a personal computer. An image photographed by a digital camera is transferred to a personal computer, for example, in the following ways: (1) multiple frames are once stored in the image memory of the camera and then, via a cable or a memory card, transferred to an external personal computer, or (2) image data captured by a digital camera is transferred directly to a personal computer, almost at the same time the image is photographed, via a high-speed digital interface between the digital camera and the personal computer. An example of the latter is disclosed in Japanese Patent Laid-Open Publication Nos. 121147/1995 and 163209/1997.

Japanese Patent Laid-Open Publication No. 121147/1995 discloses an integrated structure of a video camera and a personal computer, in which digital signals generated in the camera are directly transferred to the personal computer. When transferring digital signals from the camera to the personal computer at a higher transmission rate, this method uses a connector structure that does not include a cable and the like as a transmission line but connects, directly in a short distance, the camera to the personal computer to reduce a waveform distortion that might have been caused by the resistance and/or the parasitic capacitance of the transmission line, and to reduce a high-frequency noise radiation during high-speed data transfer. The integrated structure of the camera and the personal computer eliminates an image memory from being installed in a camera, resulting in a reduced cost. However, because the camera is powered by the battery of the personal computer, extending the available time as a whole of the camera and personal computer requires proper power management when both are used as portable equipment.

Japanese Patent Laid-Open Publication No. 163209/1997 discloses a digital camera system that controls the photographing operation of the digital camera in response to control signals from a data processing device connected to the digital camera. To transfer digital data from the camera to a personal computer at a high speed, this system uses, for example, a general-purpose parallel-port PCMCIA standard interface intended for personal computers, and an in-camera power-on control command sent from the personal computer via the interface in response to an instruction from the operator in order to take a picture. This system keeps camera powered on only when the camera operator issues an instruction, and keeps the same powered off in other cases, to minimize power consumption.

Both of the prior-art technologies described above implement the digital camera function on such a way that a digital camera unit (imaging function) and a data processing device such as a personal computer, connected to the camera unit, work together. The digital camera unit and the personal computer when working together increase operability and reduce power consumption.

However, in the prior art, the photographing part and the personal computer must be interconnected to configure a digital camera as a whole in order to implement the digital camera function. Therefore, when taking a picture, both the digital camera and the personal computer are required. Because photographing and recording cannot be executed by a camera only, the system in the prior art is extremely inconvenient as a portable system.

SUMMARY OF THE INVENTION

It is an object of the present invention to provide a digital camera that overcomes the aforementioned drawbacks encountered in the prior art and that reduces the consumption of a power supply within the digital camera.

It is another object of the present invention to provide a digital camera that does not necessarily require a special AC charging-adapter or a special charging unit.

In accordance with the present invention a digital camera for photographing a subject to output image signals representing the subject comprises an interface connectable to an external data processing device, and transferring the image signals to the data processing device; an internal power supply supplying first power to components of the digital camera; an external power receiving circuit receiving second power from the data processing device; a first switching circuit selectively switching between the internal power supply and the external power receiving circuit to supply the first or second power to the components of the digital camera; a connection detection circuit detecting that the data processing device has been connected to the interface; and a control circuit controlling the first switching circuit in response to the connection detection circuit, wherein the control circuit controls the first switching circuit in such a way that, when the connection detection circuit does not detect that the interface is connected to the data processing device, the first power is supplied to the components of the digital camera and, when the connection detection circuit detects that the interface is connected to the data processing device, the internal power supply is disconnected and the second power is supplied to the components of the digital camera.

Specifically, the digital camera in accordance with the present invention operates as follows. For example, when the digital camera is connected to an external data processing device, such as a personal computer, to transfer a photographed digital image to the data processing device, the connection detection circuit determines when the digital camera is connected to the data processing device. Then, the power is supplied from the data processing device to the components of the digital camera to start feeding the components of the digital camera, and to activate the communication with the data processing device. After this, image data may be transferred from the digital camera under the control of the data processing device. Then, the power fed from the internal power supply within the digital camera is turned off so that the internal power supply will not be used, thus minimizing the consumption of the battery.

When the digital camera is connected to the data processing device without transferring image data, the power fed to the components of the digital camera is turned off under the control of the data processing device. In this case, the digital camera will enter the standby state and allow the charging circuit to receive power from the data processing device to charge the secondary battery of the digital camera.

In addition, even when the digital camera is connected to the data processing device to transfer image data, connecting the internal power supply to the charging circuit under the control of the data processing device allows power to be supplied from the data processing device not only to feed the components of the camera but also to charge the second battery of the internal power supply, thereby increasing efficiency more.

Thus, the digital camera in accordance with the present invention, which is adapted to be detachable from a data processing device such as a personal computer when a picture is taken, has the camera function not only for photographing but also for processing signals and storing image data, and is suitable to carry. In addition, when image data is transferred, the digital camera receives power supplied from the data processing device to be turned on the consumption of the power supply within the digital camera being minimized.

The present invention provides a digital camera capable of transferring digital image data, which is photographed by the digital camera, to an external data processing device at a high speed, wherein the digital camera is convenient for carrying, thus minimizing the consumption of the battery in the camera. Also, with the digital camera connected to the external data processing device, the secondary battery in the digital camera may be efficiently charged while the camera is idle, for example, image data is not being transferred.

In addition, with power supplied from the external data processing device, the digital camera may be used not only in the image data transfer mode but also in the photographing mode under the control of the external data processing device.

BRIEF DESCRIPTION OF THE DRAWINGS

The objects and features of the present invention will become more apparent from consideration of the following detailed description taken in conjunction with the accompanying drawing in which:

the sole FIGURE is a functional block diagram showing a preferred embodiment of a digital camera according to the present invention that is connected to, and powered from, an external personal computer, and, for example, can transfer image data to the latter.

DESCRIPTION OF THE PREFERRED EMBODIMENT

With reference to the accompanying drawing, a preferred embodiment of a digital camera according to the present invention will be described in detail. Basically, this embodiment comprises a digital camera 100 and a personal computer 200 that is adapted to receive image data from the digital camera 100. The digital camera 100 and the personal computer 200 are detachably interconnected via a camera interface 150 and a personal computer interface 250. Both interfaces 150 and 250 include a connector, not shown in the FIGURE. In this embodiment, the digital camera unit 100 is interconnected directly to the personal computer 200 via this connector. Instead of directly connecting the digital camera to the personal computer, they may be connected with a cable, and the like. In the description below, a signal is represented by the reference numeral of a line on which the signal is sent.

The camera interface 150 comprises a data interface (I/F) 113, a control signal interface circuit (CONT) 114, and a power supply circuit 115. The personal computer interface 250 comprises a data interface 213, a control signal interface 214, and a power supply circuit 215.

The digital camera 100 has a photographing lens 101 thereon. The lens 101 is an optical system that forms an optical image which is conveyed by the incident light from a subject not shown in the FIGURE, on a photosensitive array, not shown, an imaging device 102 such as a charged coupled device (CCD). The CCD imaging device 102 is a photoelectric transducer that transduces, one pixel at a time, an optical image formed on the photosensitive array to an electrical signal 171 having a corresponding analog amplitude, and outputs the signal from the output line 171. The output line 171 is connected to an analog-to-digital (A/D) converter 103. In response to an image signal transferred in the form of output electrical signal 171 from the CCD imaging device 102, the analog-to-digital converter 103 converts the signal to a corresponding digital signal for convenience in the subsequent signal processing. An output digital signal 173 output from the analog-to-digital converter 103 is sent to a digital signal processor (DSP) 104.

The digital signal processor 104 has a digital-signal-processing function, by which in response to the image signal data 173 that has been converted to digital signals by the analog-to-digital converter 103, the digital signal processor 104 compresses and transfers image data under the control of a central processing unit (CPU) 106 that will be described later. Generally, the digital image signal 173 obtained from the imaging device 102 is a large quantity of data. Therefore, to save a memory area for storage and to increase the transmission speed, the digital signal processor 104 compresses the data to eliminate the redundancy of the image signals. In this embodiment, the still image data is compressed with the JPEG (Joint Photographic Experts Group) standard. An output 305 from the digital signal processor 104, which is data to be transferred externally, is transferred to the personal computer 200 via the camera interface 150. The digital signal processor 104 has an output 175 connected to a memory 105.

The memory 105, with a storage capacity of several frames of image data, is a temporary storage unit implemented by a semiconductor or a rewritable disk. The digital signal processor 104 stores digitally converted image data 175 to this memory, or reads out the data from the memory under the control of the central processing unit 106.

The central processing unit 106 plays the role of a system control unit built in the digital camera 100. In response to a control signal 304 from an operation unit 107 that will be described later, or to a control signal 302 from the external personal computer 200, the central processing unit 106 sets the photographing mode of the digital camera 100, and controls the transfer of image data, and the display of a photographed image and the operation mode of the digital camera 100 on a monitor display unit 120 that will be described later. The central processing unit 106 also outputs a switch control signal 301 to control the switching of the power to be supplied to the components of the digital camera 100.

The operation unit 107 allows an operator to manually enter operation mode data, such as a photographing instruction to the digital camera 100 or a photographed-image display mode. The instruction signal 304 is sent form the operation unit 107 to the central processing unit 106. The display unit 120 is adapted to receive a signal 177, such as a photograph image monitor signal or a mode signal of the digital camera 100, from the digital signal processor 104, and display the signals visually.

The digital camera 100 has a DC/DC converter 109. This converter is a power supply circuit that produces a voltage, required for the components of the digital camera 100, from the power supplied either from the power supply circuit 115 or from an internal power supply 112 that will be described later. The converter 109 then distributes the produced voltage to the components of the camera as indicated symbolically by a line 179. The DC/DC converter 109 contains, among its functions, a switch circuit 110 as shown in the FIGURE. In response to the control signal 301 from the central processing unit 106, this switch circuit selects one of two powers: the power from the internal power supply 112 and the power from the power supply circuit 115. The switch circuit 110 is a bi-state selection circuit that alternatively connects one of its two input terminals 181 and 183, to its output terminal 179. As shown in the FIGURE, one input terminal 181 is connected to the internal power supply 112, and the other input terminal 183 to the power supply circuit 115. When the digital camera 100 is used alone, the switch circuit 110 is connected to the internal power supply as opposite to the connection shown in the FIGURE. In response to the switch control signal 301 from the personal computer 200, the switch circuit 110 switches the power to the power supply circuit 215 of the personal computer 200. The internal power supply 112 includes a battery in the digital camera 100. In this embodiment, a re-chargeable secondary battery is used as the internal power supply 112.

The data interface 113 of the camera interface 150 is an interface circuit for an image data. The data interface 113 is adapted to transform data processed by the digital signal processor 104, or the image data 305 stored in the memory 105, to a transmission format when transferring those data to the personal computer 200 at high speed. The control signal interface circuit 114 is adapted to transfer control signals between the digital camera 100 and the personal computer 200. The control signal interface circuit 114 contains a connection detection circuit, not shown, that determines when the digital camera 100 is connected to the personal computer 200. The power supply circuit 115 is an interface circuit that receives power 313 from the power supply circuit 215 of the personal computer 200.

In this embodiment, the data interface 113, the control signal interface circuit 114, and the power supply circuit 115 are integrated in the form of a card interface structure that functions as the camera interface 150. The card interface structure has the above-mentioned connector, by which the digital camera 100 is connected to the personal computer 200. These circuits 113, 114 and 115 may be provided separately or connected via cables. The present invention is not limited to a specific type of connection structure.

The power supply circuit 115 has two outputs: one 183 is connected to the DC/DC converter 109 and the other 117 to a charging circuit 140. The charging circuit 140 receives power from the power supply circuit 115 and supplies the received power to the internal secondary battery 112 for charging. The charging circuit 140 has an output 185 connected to the internal power supply, that is, the secondary battery 112, via a switch 141.

The switch 141 is a bi-state selection circuit that, in response to a switching signal 306 from the central processing unit 106, connects selectively one of two input terminals, 185 and 187, to an output terminal 142. As shown in the FIGURE, one input terminal 185 is connected to the output of the charging circuit 140, the other input terminal 187 is connected to an AC adapter terminal 160 and, in addition, the output terminal 142 is connected to the internal power supply 112. The switch 141 operates as follows in response to the control signal 306 from the central processing unit 106. That is, when the digital camera 100 uses the power supplied from the commercial power, the switch 141 connects the output terminal 142 to the other input terminal 187; when the digital camera 100 is connected to the personal computer 200, the switch 141 connects the output terminal 142 to the input terminal 185 to connect to the power supply circuit 215 of the personal computer 200, and the internal power supply 112 is charged with the charging circuit 140.

For connection to the commercial power supply, the digital camera 100 in this embodiment has the AC adapter terminal 160 for external charging. Connecting an AC adapter, not shown, to the digital camera 100 through the AC adapter terminal 160 changes mechanically the setting of the switch 141. That is, the power supply to the internal power supply 112 is switched from the charging circuit 140 to the AC adapter terminal 160.

The interface 250 of the personal computer 200 comprises the data interface 213, the control signal interface circuit 214, and the power supply circuit 215. The data interface 213, which functions as an image data interface circuit of the personal computer 200, receives image data 310 via the interface circuit 113 of the digital camera 100 and transforms the received image data to the data signal 310 having a format suitable for processing by the personal computer 200. A control signal 311 controls the operation of the digital camera 100. The control signal interface circuits 114 and 214 transfer the control signal 311 between the digital camera 100 and the personal computer 200. The control signal interface circuit 214 of the personal computer 200 also generates a connection detection signal 312. This signal 312 indicates that the digital camera 100 has been connected to the personal computer 200, and is sent from the control signal interface circuit 214 to the control signal interface circuit 114 of the digital camera 100. The power supply circuit 215 serves as the external power supply of the digital camera 100, and is supplied from the personal computer 200 to the digital camera 100. The power supply output 313 is fed to the power supply circuit 115 of the digital camera 100. In an application in which the camera interface 150 of the digital camera 100 has a card interface structure, the interface 250 of the personal computer 200 also has accordingly a card interface structure.

In operation, in the photographing mode with the digital camera 100 not connected to the personal computer 200, the central processing unit 106 puts, by the control signal 301, the switch circuit 110 in the connection state opposite to that shown in the FIGURE. This connection causes power to be supplied from the internal power supply 112 to the components of the digital camera 100. The optical image of a subject, which has been formed through the lens 101 of the digital camera 100, is transduced to the electrical signal 171 by the CCD imaging device 102. This analog image signal 171 is then converted to the digital image signal 173 by the analog-to-digital converter 103. The digital signal processor 104 compresses the output digital image signal 173 and stores the compressed coded data 175 in the memory 105. The digital signal processor 104 also performs sub-sampling for the digital image signal 173 in order to monitor the photographed image on the display panel or unit 120.

When the operator wants to transfer image data from the digital camera 100 to the personal computer 200, he or she connects the camera interface 150 to the personal computer interface 250. The connection detection signal 312 is sent from the personal computer 200 via the control signal interface circuit 214 of the personal computer interface 250. The connection signal detection circuit in the control signal interface circuit 114 of the digital camera 100 detects the connection detection signal 312 and sends the detected signal 302 to the central processing unit 106. In response to the detected signal 302, the central processing unit 106 outputs the power switch signal 301 to the DC/DC converter 109. In response, the power switch circuit 110 switches from the power, which has been supplied from the internal power supply 112, to the power which is supplied from the power supply circuit 215 of the personal computer 200 via the power supply circuit 115 of the camera interface 150. This allows the components of the digital camera 100 to be powered by the power supply circuit 215 of the external data processing device to bring the functional units of the digital camera 100 under the control of the data processing device.

In this state, the digital camera 100 enters the communication waiting state and waits for the personal computer 200 to send the control signal 311. In response to the control signal 311 from the personal computer 200, the central processing unit 106 of the digital camera 100 outputs a transfer instruction signal 303 to the digital signal processor 104 to ask it to transfer the image data 175 stored in the image memory 105. The digital signal processor 104 receives the image data 175 of a frame, which is specified by the transfer instruction signal 303, from the memory 105 and outputs the image data 305 to the data interface 113. The data interface 113 transforms the image data 305 to a high-speed digital interface format and transmits the transformed image in the form of the transmission data 310. The data interface 213 of the personal computer 200 receives the transmission data 310, performs required format conversion for the received data, and the converted data is stored in a memory, not shown, to allow the operator to edit the stored data on the personal computer 200.

When the camera enters its so-called standby state in which the digital camera 100 and the personal computer 200 are connected through the camera interface 150 and the personal computer interface 250 but no image data is being transferred, the personal computer 200 sends the control signal 311 to the central processing unit 106 of the digital camera 100 to notify that the camera is now in the standby state. Then, the central processing unit 106 outputs a control signal 307 to the power supply circuit 115 to supply power from the power supply circuit 115, not to the DC/DC converter 109, but to the charging circuit 140. This causes the output 117 from the power supply circuit 115 to be supplied to the charging circuit 140 only. The central processing unit 106 also sends the charging instruction signal 306 to the switch 141 of the charging circuit 140. In response to this signal, the switch 141 connects the output 185 of the charging circuit 140 to the internal power supply 112 that is a secondary battery. In this way, this configuration allows the internal power supply 112 to be charged by the personal computer 200.

When an AC adapter is connected to the AC adapter terminal 160, the switch 141 is switched to the side of the AC adapter terminal 160 to allow the internal power supply 112 to be charged by the commercial power supply via the AC adapter.

Although the connection detection signal 312 is sent from the personal computer 200 to the digital camera 100 in this embodiment, the connection to the personal computer 200 need not always be detected by means of the connection detection signal 312 from the personal computer 200. For example, the system may be adapted to sense the voltage of the power supply circuit 215 from the personal computer 200 higher than a specific threshold to determine when the digital camera 100 is connected to the personal computer 200. Also, the present invention is not limited to the method described above. For example, the detection of the grounding of the personal computer 200 with respect of the internal power supply 112 or the detection of a mechanical connection may be available to determine when the digital camera 100 is connected to the personal computer 200.

In the embodiment described above, image data stored in the memory 105 is sent to the personal computer 200. Another operation mode is also possible in which image data produced by the CCD imaging device 102 is read out from the CCD imaging device 102 for direct transfer to the personal computer 200. In such an operation mode, the switch circuit 110 is also set to the side of the power supply circuit 115 as long as the personal computer 200 is connected, and it is possible to supply power from the power supply circuit 215 of the personal computer 200 to the components of the digital camera 100.

As described above, when it is detected that the digital camera 100 is connected to the personal computer 200 that is an external unit, the internal power supply 112, such as a battery contained in the digital camera 100, is not used but the power to the components of the digital camera 100 is switched to the power supply circuit 215 of the personal computer 200 for transfer of data between the digital camera 100 and the personal computer 200. This configuration reduces the consumption of the battery 112 of the digital camera 100.

In addition, when the digital camera 100 is connected to the personal computer 200 but is not used for photographing or data transfer, the power to the components of the digital camera 100 is turned off to put the camera in its standby state. In this state, the power supply of the personal computer 200 is used to charge the secondary battery 112 of the digital camera 100. This method makes it possible to efficiently charge the battery 112 in a period of time during which the digital camera 100 is not used.

As described above, the digital camera in this embodiment charges the internal secondary battery 112 with the external power supply when the digital camera 100 is not used. When data is being transferred, the components of the digital camera 100 receive power from the external device 200 with the internal secondary battery 112 disconnected (opened) by the switch circuit 110 of the DC/DC converter 109. Therefore, the digital camera 100 may also be configured such that the central processing unit 106 issues the control signal 307 to keep on supplying power from the power supply circuit 115 to the DC/DC converter 109 over the line 183 and, at the same time, connects the charging circuit 140 to the secondary battery 112 via the switch 141 to charge the charging circuit 140 while supplying power to the components of the digital camera 100. In this case, in response to the control signal 311 from the personal computer 200, the central processing unit 106 sends the charging instruction control signal 306 to the switch 141 to supply power from the charging circuit 140 to the internal power supply 112. This configuration makes it possible to efficiently charge the internal secondary battery 112 while the digital camera 100 remains connected to the external data processing device.

As described above, when the digital camera according to the present invention is connected to an external data processing device, such as a personal computer, for high-speed data transfer to allow the user to produce the device with image data which is produced by the digital camera, and to edit the image data, the digital camera detects that it is connected to the external data processing device and waits for a signal from the external data processing device. In response to a control signal from the external data processing device, the digital camera switches the digital camera component power from the internal power supply of the digital camera to the power supply of the external data processing device and starts operation of the digital camera to transfer image data. This configuration reduces the consumption of the internal battery of the digital camera.

In addition, when the digital camera is not transferring image data, the power supplied to the components of the camera is stopped and, instead, the power from the external data processing device is supplied to the charging circuit to charge the internal secondary battery. This configuration efficiently charges the battery when the camera is in its standby state. In addition, in an application in which the digital camera is connected to the external data processing device to charge the internal secondary battery in the digital camera while feeding the power to the components of the camera by the power supply of the external data processing device, the dedicated charging period of time can further be reduced. Also, the ability to charge the secondary battery of the digital camera by the external data processing device eliminates the need for a special charging unit such as an AC adapter.

The entire disclosure of Japanese patent application No. 2000-279702 filed on Sep. 14, 2000, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A digital camera for photographing a subject to output image signals representing the subject, comprising:

an interface connectable to an external data processing device, the interface transferring the image signals to the data processing device;

an internal power supply for supplying a first power to components of said digital camera;

an external power receiving circuit for receiving a second power from the data processing camera;

a first switching circuit for selectively switching between said internal power supply and said external power receiving circuit to supply the first or the second power to the components of said digital camera;

a connection detection circuit for detecting that the data processing device has been connected to said interface; and a control circuit for controlling said first switching circuit in response to said connection detection circuit, wherein said control circuit controls said first switching circuit in such a way that, when said connection detection circuit does not detect that said interface is connected to the data processing device, the first power is supplied to the components of said digital camera, and when said connection detection circuit detects that said interface is connected to the data processing device, said internal power supply is disconnected and the second power is supplied to the components of said digital camera, and wherein said internal power supply comprises a secondary battery, and said digital camera, further comprises an adapter connector for connecting a charging adapter to charge said secondary battery by a commercial power supply, a charging circuit for charging said secondary battery, and a second switching circuit for charging said secondary battery selectively through said charging circuit or through the charging adapter via said adapter connector, the charging adapter connected to the secondary battery without passing through the charging circuit.

2. The digital camera is accordance with claim 1, wherein, when said connection detection circuit detects that the data processing device is connected to said digital camera, said control circuit transfers the image signals to the data processing device in response to an instruction from the data processing device.

3. The digital camera in accordance with claim 1, wherein, when said connection detection circuit detects that said digital camera is connected to the data processing device and data is not being transferred to the data processing device, said control circuit turns off the second power to the components of said digital camera and allows the secondary battery to be charged through said charging circuit.

4. The digital camera in accordance with claim 1, wherein, when said connection detection circuit detects that said digital camera is connected to the data processing device, said control circuit allows said first switching circuit to supply the second power to the components of said digital camera while said secondary battery is charged through said charging circuit.

* * * * *